United States Patent [19]

Hempenstall

[11] Patent Number: 4,902,309
[45] Date of Patent: Feb. 20, 1990

[54] IMPROVED METHOD FOR THE IGNITION AND COMBUSTION OF PARTICULATES IN DIESEL EXHAUST GASES

[76] Inventor: George T. Hempenstall, 520 Woodlake Dr., Louisville,, Ky. 40223

[21] Appl. No.: 266,076

[22] Filed: Nov. 2, 1988

Related U.S. Application Data

[63] Continuation of Ser. No. 65,837, Jun. 24, 1987, abandoned.

[51] Int. Cl.$^4$ .................... B01D 53/04; B01D 39/20
[52] U.S. Cl. .............................................. 55/33; 55/68;
55/75; 55/96; 55/179; 55/282; 55/389; 55/523;
55/DIG. 10; 55/DIG. 30
[58] Field of Search .................. 55/33, 62, 68, 75, 96,
55/161–163, 179, 282, 389, 521, 523, DIG. 10, DIG. 30

[56] References Cited

U.S. PATENT DOCUMENTS

| | | | |
|---|---|---|---|
| 3,446,011 | 5/1969 | Ohno | 60/30 |
| 3,486,326 | 12/1969 | Hermes et al. | 60/29 |
| 3,618,314 | 11/1971 | Krebs | 55/DIG. 30 |
| 3,808,805 | 5/1974 | Miramontes | 60/274 |
| 3,923,477 | 12/1975 | Armond et al. | 55/68 X |
| 4,007,021 | 2/1977 | Gyllinder | 55/62 X |
| 4,167,852 | 9/1979 | Ludecke | 60/296 |
| 4,256,469 | 3/1981 | Leitgeb | 55/62 X |
| 4,276,071 | 6/1981 | Outland | 55/523 |
| 4,319,896 | 3/1982 | Sweeney | 55/213 |
| 4,329,158 | 5/1982 | Sircar | 55/62 X |
| 4,329,162 | 5/1982 | Pitcher, Jr. | 55/DIG. 30 |
| 4,335,574 | 6/1982 | Sato et al. | 55/DIG. 30 |
| 4,340,403 | 7/1982 | Higuchi et al. | 55/DIG. 30 |
| 4,345,431 | 8/1982 | Suzuki et al. | 55/DIG. 30 |
| 4,364,761 | 12/1982 | Berg et al. | 55/DIG. 30 |
| 4,404,795 | 9/1983 | Oishi et al. | 55/DIG. 10 |
| 4,416,675 | 11/1983 | Montierth | 55/DIG. 30 |
| 4,436,535 | 3/1984 | Erdmannsdörfer et al. | 55/96 |
| 4,439,213 | 3/1984 | Frey et al. | 55/62 X |
| 4,450,682 | 5/1984 | Sato et al. | 55/DIG. 10 |
| 4,481,767 | 11/1984 | Stark | 55/DIG. 10 |
| 4,502,278 | 3/1985 | Stark | 55/DIG. 10 |
| 4,509,915 | 4/1985 | Ito | 55/158 X |
| 4,519,820 | 5/1985 | Oyobe et al. | 55/DIG. 30 |
| 4,522,028 | 6/1985 | Hasegawa et al. | 55/DIG. 10 |
| 4,541,239 | 9/1985 | Tokura et al. | 55/DIG. 30 |
| 4,544,388 | 10/1985 | Rao et al. | 55/DIG. 10 |
| 4,557,108 | 12/1985 | Torimoto | 55/DIG. 30 |
| 4,571,938 | 2/1986 | Sakurai | 55/DIG. 30 |
| 4,604,868 | 8/1968 | Nomoto et al. | 55/DIG. 30 |
| 4,615,173 | 12/1986 | Usui et al. | 55/DIG. 30 |
| 4,622,810 | 11/1986 | Shinsei et al. | 55/DIG. 30 |
| 4,622,811 | 11/1986 | Distel et al. | 55/96 X |
| 4,628,689 | 12/1986 | Jourdan | 55/DIG. 30 |
| 4,641,496 | 2/1987 | Wade | 55/DIG. 30 |
| 4,651,524 | 3/1987 | Brighton | 55/282 X |
| 4,684,377 | 8/1987 | Haruna et al. | 55/62 X |
| 4,685,939 | 8/1987 | Kratz et al. | 55/62 X |
| 4,686,827 | 8/1987 | Wade et al. | 55/282 X |

FOREIGN PATENT DOCUMENTS 49-71315  7/1974  Japan .
57-38765  3/1982  Japan .

Primary Examiner—Robert Spitzer
Attorney, Agent, or Firm—Gipple & Hale; John S. Hale

[57] ABSTRACT

Apparatus and process for removing particulates from a flow of exhaust gas exhausted from a diesel engine and trapped in a filter including a compressor which produces dry compressed air and transports it into at least one oxygen saturation container provided with an oxygen adsorber adapted to receive the compressed air and adsorb oxygen from it. The oxygen enriched air thus generated is directed through a valve and conduit into a section of the particulate filter wherein the high partial pressure of oxygen causes particulate combustion. Each section of the trap is exposed in turn to the oxygen enriched air thus effecting a complete regeneration of the filter. Oxygen depleted compressed air is directed through the valve and separate conduit to a reservoir where it can be used for actuating the air brakes of a vehicle or other compressed air uses.

15 Claims, 4 Drawing Sheets

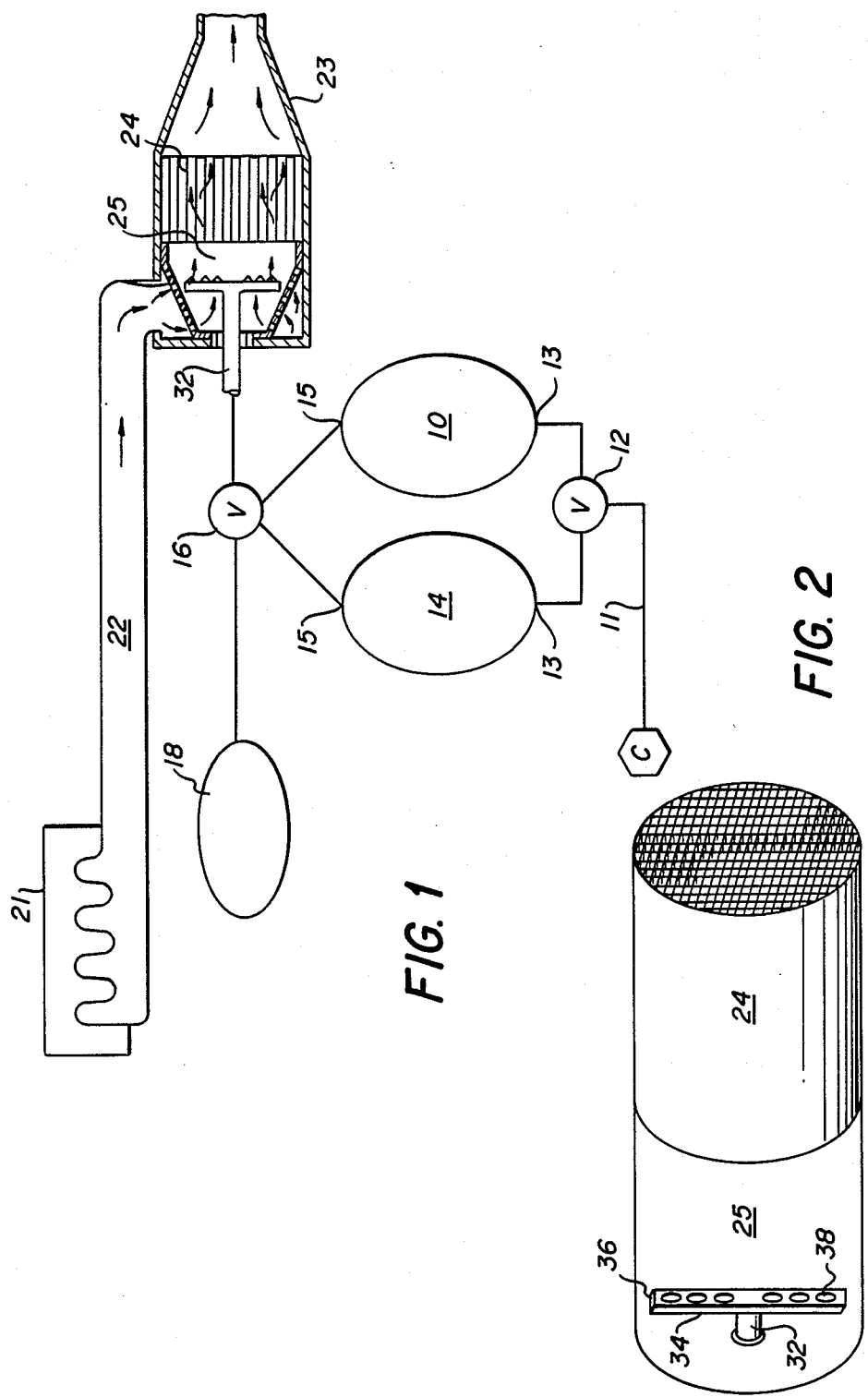

IMPROVED METHOD FOR THE IGNITION AND COMBUSTION OF PARTICULATES IN DIESEL EXHAUST GASES

This is a continuation of application Ser. No. 065,837, filed June 24, 1987, now abandoned.

BACKGROUND OF THE INVENTION

The invention generally relates to a process for reduction in the ignition temperature of diesel carbon out of the exhaust gases of diesel engines.

The normal operation of a diesel engine results in the generation of carbon soot particles and various other carbonaceous particulates (some of which are known carcinogenics) commonly referred to collectively as "particulates". In addition, various other harmful substances are formed, including nitric oxides and carbon monoxide.

It is highly desirable to remove the major portion of these substances before allowing the exhaust gases to escape into the atmosphere, and extensive research and development has been performed by parties interested in finding a solution to this problem.

It is well known in the art that a filter can be installed in the exhaust gas stream in order to trap the particulates formed during the operation of the diesel engine. Such filters can be made from a variety of materials but are usually constructed from a ceramic or metal monolithic structure. The most common form of the filter is a porous ceramic monolith having a plurality of parallel ducts which extend through the structure except that each duct has only one opening. Thus, the ducts which are open at one end are closed at the other. In addition, when viewed from each end, it will be observed that each open duct is surrounded by ducts which are sealed. Exhaust gases entering one end of a ceramic monolith enter the open ducts but must permeate the porous walls into adjacent ducts in order to exit the filter. In doing so, a portion of the particulates are trapped within the pores of the duct walls. The pore size of the duct walls will determine the quantity of particulates retained and hence the efficiency of the trap. The main ingredient of the particulates which adhere and are trapped in the filter is carbon. As the mass of particulates trapped on the filter increases the exhaust gases are impeded by the pore blockage causing an increase in pressure. This in turn results in an increased back pressure on the engine and a reduction in engine efficiency. It is therefore desirable that the particulates be removed from the filter before such a condition causes operational problems, or alternatively that the filter is removed and replaced with one which is free of particulates. Economics and the practicalities of operating a filter trap device dictate that the removal of the particulates should be carried out in situ with the preferred method of removal being by combustion. The ignition temperature of carbon particulates is approximately 550° C. When the exhaust gases and filter are heated to temperatures higher than 550° C., the particulate becomes carbon dioxide. These ignition temperatures are only achieved if a truck engine is operated under heavy load conditions such as those which may be encountered when climbing a steep gradient or at higher speeds than the 55 miles per hour permitted by current legislation. On level grades, the exhaust gas temperature is often below the ignition temperature of the particulates or soot and hence a progressive buildup occurs on the filter. As an example, the temperature of the exhaust gas of a diesel engine used in ordinary automobiles when operated at normal speeds is approximately 400° C. The unpredictability of establishing consistently high exhaust gas temperatures to prevent excessive buildup of soot can give rise to the problems previously described.

In order to overcome this problem, it has been suggested that the filter can be periodically heated by electrical means to a temperature sufficiently high to burn off the retained soot. The use of such a device is not without risk, for as noted in U.S. Pat. No. 4,319,896, care must be exercised during burnoff of the soot particulates as the possibility exists that excessively high temperatures may develop which could damage the filter.

Another possible solution to the problem provides for the deployment of a burner in the exhaust system ahead of the filter which is ignited as necessary to raise the exhaust gas temperature to the desired level of carbon burnoff. Such a burner is shown by U.S. Pat. No. 4,622,810. Accordingly, a sophisticated exhaust gas cleaner available today comprises, in addition to the filter, a burner adapted to be regularly and at periodic intervals operated to heat the exhaust gases to a temperature high enough to allow the carbon particulates trapped in the filter to be combusted. Examples of cleaners of the type described above are disclosed, for example, in Japanese Laid-open Patent Publication No. 49-71315, published July 10, 1974; U.S. Pat. Nos. 4,167,852 and 4,335,574; Japanese Patent Publication No. 57-38765, published Aug. 17, 1982; and U.S. Pat. Nos. 4,345,431, 4,327,111 and 4,604,868.

Each of these methods of solving the soot build up problem are also associated with an increase in fuel consumption which detracts from one of the major advantages of the diesel engine.

Other methods which have been devised to prevent an excessive soot buildup on the filter involve the use of catalytic materials which are deposited on the monolithic structure and cause a lowering of the ignition temperature of the carbon. Various individuals have tested combinations of catalytic agents to achieve this end and many have been successful. However, the extent to which the temperature reduction takes place is insufficient to ensure that burn off will occur and a temperature differential still exists between the "normal" exhaust gas temperature and the carbon ignition temperature.

It is known in the art that the propensity for a combustible material to ignite increases as the partial pressure of $O_2$ increases. This manifests itself as a decrease in the ignition temperature of the combustible material.

Existing methods which can be used to increase the partial pressure of $O_2$ in the diesel exhaust gases include the introduction of additional air with the fuel. The quantity of air so introduced, however, is limited before a loss in engine efficiency results. Direct air introduction to the exhaust gases has been considered. By doing so, approximately 4 mols of $N_2$ are introduced for each mol of $O_2$. Any significant increase of $O_2$ partial pressure is therefore accompanied by a major increase in the total volume of the exhaust gases and hence the back pressure on the engine. Such methods do not offer a practical solution for achieving lower ignition temperatures.

Examples of methods of increasing the oxygen are shown by U.S. Pat. No. 4,604,806. This patent generally discusses the problem of carbon particulate removal from the diesel engine exhaust gases and describes an air pressure regulating device which increases the pressure of combustion air supplied to the exhaust gases upstream of the filter used to remove the carbon particulates. Another U.S. Pat. No. 3,446,011 discloses the provision of air oxygen to accelerate combustion of the exhaust gases. In addition U.S. Pat. Nos. 4,622,810; 4,557,108; 3,808,805; and 3,486,326 disclose various systems for removing particulate exhaust gases of internal combustion engines in which air is supplied to the exhaust prior to treatment.

Certain fuel additives are known to promote low temperature ignition of the carbonaceous particulates produced during the operation of a diesel engine. However, separation of these components from the fuel can deposit within the engine and interfere with its operation as well as provide possible health hazards.

It is therefore an object of this invention to effect the ignition of the carbon at the lower temperatures prevailing in the exhaust gases and also to prevent excessive build up of carbon on the filter, thereby avoiding the risk of damage to the filter from high temperatures. The invention may be used in conjunction with other devices used for lowering the ignition temperatures of the carbon and promoting its combustion.

SUMMARY OF THE INVENTION

The invention comprises a system generating oxygen enriched air which is introduced into the exhaust gases of the diesel engine by a suitable device at a location preceding the diesel soot filter. The particles of carbon produced during the normal operating cycle of a diesel engine are exposed to a higher partial pressure of $O_2$ than would normally exist in the exhaust gases. This pressure and oxygen enrichment causes the carbon to ignite at the lower temperatures consistent with normal exhaust gas temperatures.

The oxygen enriched air can be generated by a number of methods, but the preferred method in this invention is to adsorb $O_2$ from compressed air designated for use in the vehicle air brakes in order to minimize power use. The methods used to generate dry compressed air for use in activating the air brakes of a vehicle are already well known and in common use in the industry. They are comprised essentially of a compressor which receives air from the atmosphere and compressed it to approximately 125 psi and then delivers it to a dryer which contains a moisture adsorbent, as for example a molecular sieve. This reduces the dew point of the air down to less than 30° F. below ambient dew point, thus preventing corrosion and condensation of water vapor in the air lines which might ultimately cause the brakes to malfunction.

The dry compressed air is then delivered to a reservoir for storage until required for braking. Various and sundry auxiliary controls are necessary to ensure that the desired pressure range is maintained in the reservoir and for regenerating the molecular sieve as it becomes saturated with water vapor. The dry compressed air is passed through one of two parallel vessels, each containing an adsorbent which selectively removes the $O_2$ from the air until the desired oxygen enrichment is obtained at which time pressurized oxygen enriched air is transported to the filter for carbon particulate combustion.

BRIEF DESCRIPTIONS OF THE DRAWINGS

FIG. 1 is a schematic diagram of the present inventive apparatus;

FIG. 2 is a perspective view of the filter housing with oxygen introduction assembly;

DETAILED DESCRIPTION OF THE DRAWINGS

Figure 3:
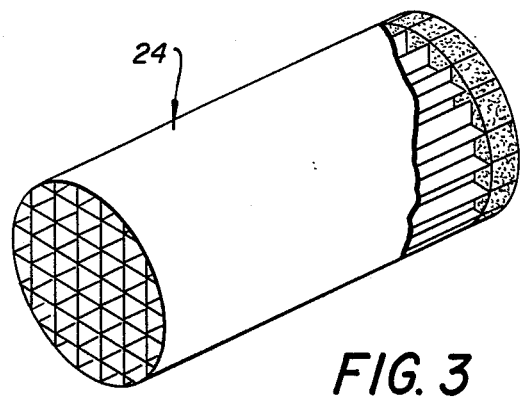
FIG. 3 is a perspective view of the filter with sections removed for viewing.

The preferred embodiment and best mode of the invention is shown in FIGS. 1-5. In reference to FIG. 1, there is an example of the basic components of the invention in which cool, dry, compressed air of at least 85 psi and preferably approximately 100–125 psi is directed from an air brake compressor C through conduit 11. The conduit 11 is provided with a two way valve 12 located near the inlet 13 of the vessels 10 and 14 each of which contain an adsorbent which preferentially adsorbs $O_2$. This adsorbent can be in the form of a liquid in which oxygen is soluble or may be a solid which adsorbs oxygen. The preferred adsorbent used is activated carbon with a pore size range of 3 to 4 angstroms which preferentially adsorbs $O_2$. Upon the reduction of pressure the $O_2$ is released. Another example of such a solid is barium oxide. When pressurized air encounters the barium oxide, it reacts with the barium oxide to form barium peroxide. Upon reduction of pressure, the barium peroxide will revert to barium oxide by releasing oxygen which is then transmitted directly into the filter.

The $O_2$ depleted air at the outlet 15 of vessel 10 is directed by means of a three way valve 16 into a receiver or reservoir 18 where it is stored for use in actuating the air brakes as needed. If desired, the depleted air can be vented into the atmosphere.

Figure 5:
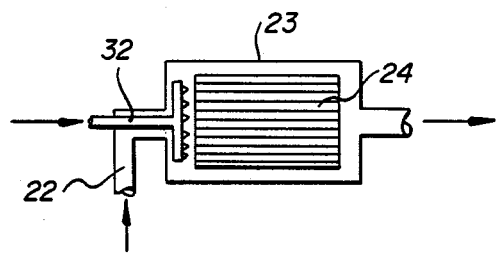
FIG. 5 is a partial schematic view of the filter shown in Figure two connected with the apparatus in Figure one.

After a predetermined time period, dependent on the amount of adsorbent loaded in the vessels and the pressure at which the compressed air is being generated, the adsorbent becomes saturated and flow is discontinued. A common off the shelf meter can be used to signal when the adsorbent level is reached. The two way valve 12 redirects the compressed air from compressor C into the second vessel 14 and the three way valve 16 opens to permit the flow of $O_2$ depleted air from vessel 14 to the brake reservoir 18 or a storage reservoir. Concurrently with this change in fluid flow direction, vessel 10 containing oxygen enriched air at a pressure greater than 85 psi is allowed to simultaneously depressurize through the three way valve 16 into the exhaust system of the vehicle, basically comprising the diesel engine 21 and exhaust duct 22, at a location in the filter housing 23 where it contacts the particulates deposited on the filter 24 and permits ignition to occur. As previously indicated, the filter is preferably of a construction made of a porous ceramic material having parallel axially extending flow passages. Examples of such filters are shown by U.S. Pat. Nos. 4,519,820, 4,416,675, 4,364,761, 4,340,403, 4,329,162 and 4,276,071, which are incorporated herein by reference. The filter housing 23 can also be used to define a burner chamber immediately before the filter entrance if such a need is required. Various types of burners have been previously disclosed and such patents and publications are incorporated by reference. The burner can be any one of a number of standard burners used in the art to produce a combustion product with heat or flame of high temperature to combust the carbon particulates accumulating on the filter 24. At the completion of this cycle after ignition, the flow of $O_2$ enriched air is discontinued from vessel 10, and vessel 10 is repressurized with compressed air. The $O_2$ enriched air adsorbed in vessel 14 is then depressurized into the exhaust duct 22 ahead of the filter 24 in the same way with the three way valve 16 reversing the flow cycle. By alternating each vessel 10 and 14 through an adsorption/desorption cycle, a constant controlled stream of $O_2$ enriched air can be introduced into the engine exhaust system. In certain instances it may be advantageous to desorb both vessels simultaneously, thus allowing an increased flow rate of $O_2$ enriched air to be introduced into the exhaust system of the engine and thus produce an increased flow rate of air intermittently. This would be dictated by the operating conditions of the engine and the rate at which soot formation is occurring. It is recognized that a desirable variation might include a low pressure storage receiver 28 for the $O_2$ enriched air as shown in FIG. 5 depending on the design of the diesel engine and the $O_2$ requirements necessary to maintain the filter in a relatively clean condition.

The exhaust gases from the normal operation of a diesel can achieve rates of up to approximately 30 CFM. The amount of $O_2$ enriched air which can be generated in a given time is largely a function of adsorbent used and hence the availability of the space. The amount of $O_2$ enriched air which can be generated from a practical standpoint is significantly less than that of the exhaust gases. Therefore, in order to optimize the $O_2$ pressure contacting the particulates, a device may be installed which will reduce the dilution effect of the exhaust gases. The diesel filter 24 itself may comprise a packing of temperature resistant metal body or a filter element according to the previously noted U.S. Patents. The form of the filter is however preferably a ceramic monolithic structure with numerous flow channels as previously described in this application. Regardless of the type of filter used, the entrapment of particulates is achieved by splitting the flow of the exhaust gases into a series of discreet quantities. For example, those experienced in the art of developing a filter trap are aware that a cell density of 15 per inch squared is suitable for these applications. Using the cell density of 15 per inch squared as an example, the flow of exhaust gases through each of the cells of a filter having dimensions of 5.4" diameter and 8.5" long is 0.174 $ft^3$ per min (CFM). It has been shown by experimentation that the ignition temperature of the particulates deposited on the catalyzed filter trap by a normally operated diesel engine is reduced to 350° C. if the $O_2$ level of the exhaust gases contain 12% $O_2$. It can be calculated that in order to produce an $O_2$ level of 12% in each cell, it is necessary to introduce 0.0227 $ft^3$ per minute (CFM) of 35% $O_2$ in oxygen enriched air in order to increase the overall O in the mixture passing through each cell to initiate combustion of the soot. Depending on the oxygen enrichment a burning temperature range of 250° C. to 400° C. can be utilized to burn away the carbon particulate when the enriched oxygen levels of the combined gas range from 10 to 20% $O_2$.

Figure 4:
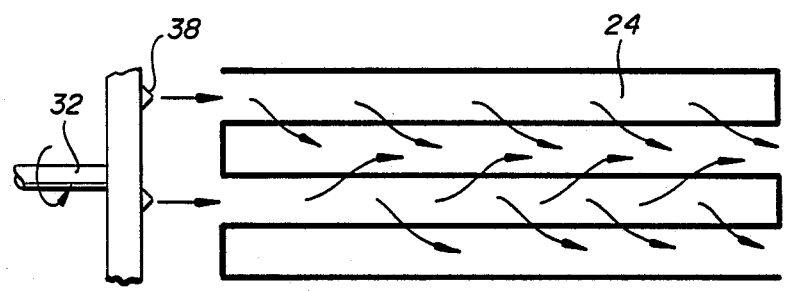
FIG. 4 is a partial cross-sectional view of the filter shown in Figure two.

A suitable enriched oxygen introduction assembly 30 for introducing the oxygen enriched air to the exhaust gases is shown in FIGS. 2-4 and comprises a hollow rotating shaft 32 through which the $O_2$ enriched air flows to a second pipe 34 mounted to the rotating shaft perpendicular to the axis of a rotation and closed at each end 36. The second pipe 34 is equipped with a series of nozzles 38 which face the inlet end 26 of the filter 24. It is also envisioned that a stationary ring or conical device with a plurality of spaced apertures could be substituted for the rotating assembly.

The oxygen enriched air flows into the rotating distributor shaft 32 and is projected from each of the nozzles 38 towards the open cells of the filter trap. The power required for rotation of the distributor shaft is derived from the velocity of the exhaust gases passing over a small turbine (not shown) and the rate of air introduction is governed by the open cell space across the filter. Here the oxygen enriched air is mixed with the exhaust gases entering the cells. The higher partial pressure of the enriched $O_2$ in those cells will ignite the particulates reducing them to carbon dioxide. After a given period of time which can be determined for each type of diesel engine, the distributor is rotated the amount necessary to permit air flow into the next adjacent open cells. The position of the air nozzles 38 on one arm of the distributor may be spaced differently to those on the other arm, thus permitting each cell of the trap to be exposed to the optimum quantity of oxygen enriched air. An alternative and simpler method of introducing $O_2$ enriched air involves the depressurization of both adsorbent vessels simultaneously. The rate of depressurization will determine the flow rate at which the $O_2$ enriched air is introduced. Using the previously illustrated example, a discharge rate of 15 sec. will produce a combined $O_2$ level of 12.1% in the exhaust gases to initiate combustion of the particulates. A more rapid discharge rate can be used to increase the level of $O_2$ as necessary.

While the range of $O_2$ in the pressurized oxygen enriched air can vary from 25% to 60% $O_2$, a desirable further improvement of the invention provides that the $O_2$ enriched air contains a higher percentage of oxygen than the 35% used as the main example herein.

Figure 6:
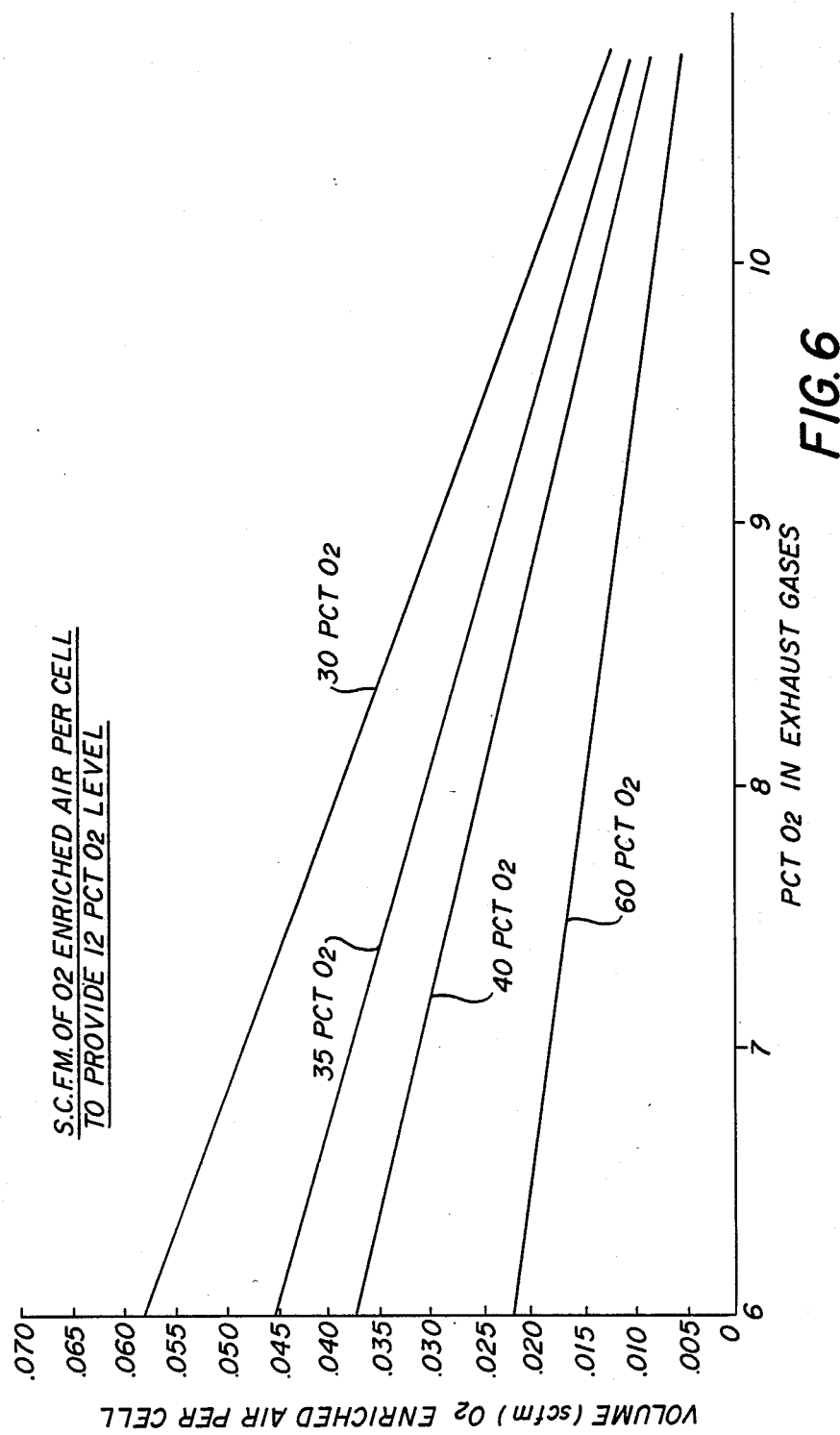
FIG. 6 is a schematic view of another embodiment of the present invention.
Figure 7:
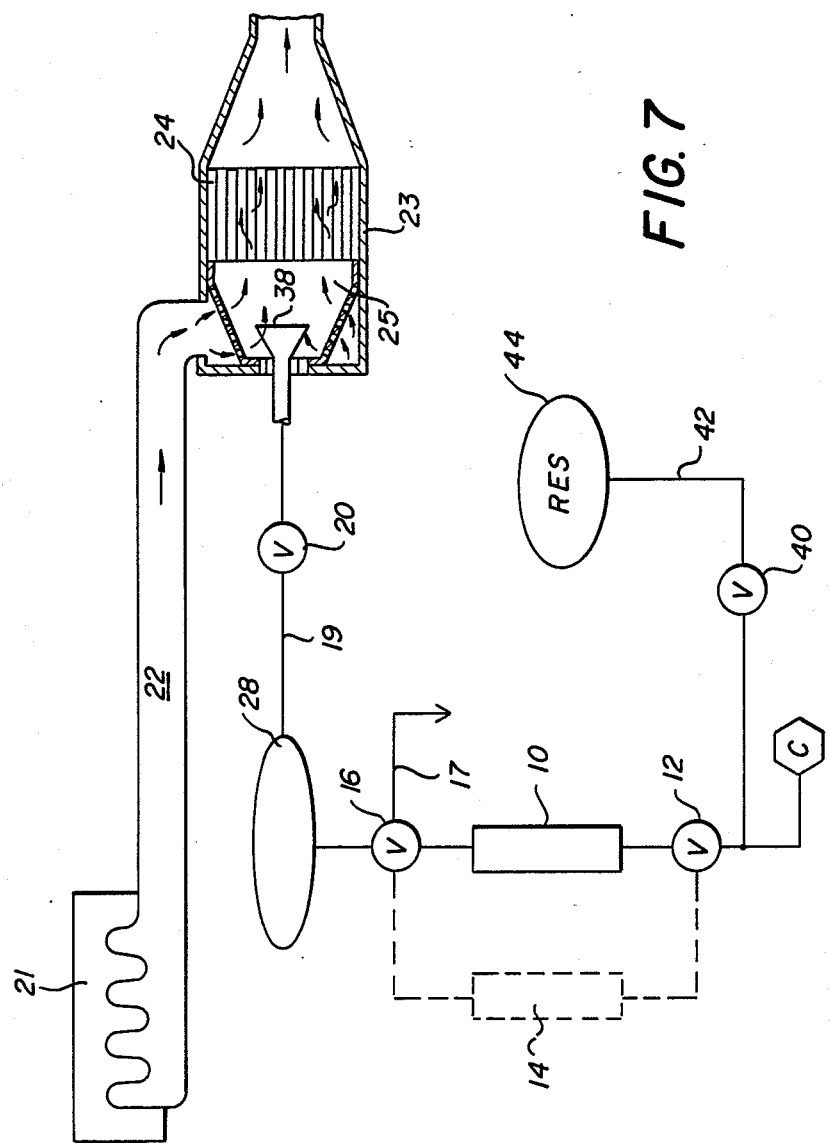

Another embodiment of the invention is shown in FIG. 6. In this embodiment, a molecular sieve is used which adsorbs nitrogen from the dry compressed air. With reference to FIG. 6, there is shown an example of such a system in which vessel(s) 10/14 contains the adsorbent material into which dry oil free compressed air is directed through valve 12. Adsorption of $N_2$ occurs through the molecular sieve mounted in the vessel and a continuous stream of oxygen enriched air leaves vessel 10 passing through valve 16 into the reservoir 28. When the $O_2$ content of the enriched air in reservoir 28 falls to approximately 12.2 to 12.5%, flow is discontinued by closing valve 12. The position of valve 16 is changed thus allowing the vessel to depressurize to the atmosphere through line 17. Desorption of the nitrogen enriched air occurs and vessel 10 may then be repressurized in readiness for the next adsorption cycle.

The pressurized reservoir 28 containing oxygen enriched air with an $O_2$ content of approximately 35% or more is then available for introduction into the exhaust system of the engine through line 19 and it's associated valve 20 into the combustion chamber 25 immediately preceding the filter 24.

Flow may be controlled on a continuous or intermittent basis as needed for ignition and combustion of the particulates deposited on the filter.

In certain instances, largely dependent upon economy factors, it may be advantageous to install vessel 14 also containing adsorbent material in which case the two vessels may alternate on an adsorption desorption cycle.

If the compressor C used to generate the oil free dry compressed air is also intended for use in actuating the air brakes, it may be desirable to direct a portion of the air through valve 40 and line 42 to the air brake reservior 44.

While the general embodiments of the present invention have been described, it will be apparent to those of ordinary skill in the art that various alternative configurations and embodiments can readily be adapted to the present invention and are considered to fall within the scope thereof as set forth in the following claims.

What is claimed is:

1. A process for low temperature combustion of diesel particulates trapped in a vehicle emission filter using compressed air produced by compressor means in the vehicle air brake system comprising the steps of:
   a. adsorbing oxygen from compressed air used to actuate a vehicle air brake system by allowing the compressed air to flow into an adsorber means within a container;
   b. venting the compressed oxygen depleted air from the container into the vehicle air brake system;
   c. desorbing the sorbed oxygen enriched air so that it has an enriched oxygen content ranging from 30 to 60% $O_2$;
   d. feeding the pressurized enriched oxygen into exhaust gases entering a diesel filter comprising a plurality of cells so that the combined gases in the cells have an enriched oxygen content which is greater than 20.8% $O_2$; and
   e. burning the oxygen enriched exhaust gases to a temperature range from 250° to 400° C. for combustion of filter particulates.

2. The process as defined in claim 1 wherein the temperatures of the burning enriched exhaust gases is about 350° C.

3. Apparatus for removing particulates from a flow of exhaust gas exhausted from a diesel engine and trapped in a filter comprising:
   means for producing compressed air,
   oxygen saturation means connected to the means for producing compressed air comprising at least one container provided with oxygen adsorber means receiving said compressed air and adsorbing oxygen therefrom; means to desorb oxygen from said oxygen adsorber means to form oxygen enriched air having more than 20.8% $O_2$,
   conduit means providing communication of said oxygen saturation means with a filter, said filter comprising a porous ceramic monolithic structure defining a plurality of cells which extend through the structure, and
   valve means positioned in said conduit means to selectively direct oxygen enriched air of at least 20.8% $O_2$ into the cells of said filter which with the exhaust gases passing into said filter provide for combination of particulates trapped in said filter.

4. Apparatus as claimed in claim 3 wherein said oxygen enriched air communicates with a preheater means and is preheated by said preheater means.

5. Apparatus as claimed in claim 3 wherein said oxygen saturation means comprises at least two containers selectively communicating with said compressed air each container being provided with an adsorbent which selectively removes the $O_2$ from the air and means to bleed the oxygen depleted air from each container.

6. Apparatus as claimed in claim 5 wherein a valve means is positioned on a conduit leading from the compressed air means to selectively direct or stop a flow of compressed air into one or the other of said containers.

7. Apparatus as claimed in claim 3 wherein said compressed air has a pressure greater than 85 psi.

8. Apparatus as claimed in claim 3 wherein the oxygen enriched air introduced to the exhaust gases is at least 25% $O_2$.

9. Apparatus as claimed in claim 3 including means for producing dry compressed air, said means for producing dry compressed air comprising a compressor and a dryer which reduces the dew point of the air down to 30° below ambient dewpoint.

10. Apparatus for removing particulates from a filter filtering a flow of exhaust gas exhausted from a diesel engine, comprising;
    oxygen saturation means comprising at least one container provided with an oxygen adsorbent means located downstream from a source of dry compressed air, said oxygen adsorbent means providing oxygen to the air in said container so that the oxygen in the container is enriched to a range between 30% and 60% $O_2$; and
    conduit means communicating with said oxygen saturation means and a particulate filter means constructed with a plurality of cells; and
    enriched oxygen selection means connected to said conduit means to selectively direct pressurized oxygen enriched air into to a plurality of cells of said particulate filter means which are also in the path of engine exhaust gases so that said pressurized oxygen enriched air and exhaust gases form a gaseous mixture having a content greater than 20.8% $O_2$ of the total volume of the gaseous mixture to ignite particulates in a temperature ranging between 250° and 400° C.

11. Apparatus as claimed in claim 10 wherein said temperatures is about 350° C.

12. Apparatus as claimed in claim 10 wherein said pressurized oxygen enriched air is at least 25% $O_2$.

13. Apparatus as claimed in claim 10 wherein said pressurized oxygen enriched air is pressurized greater than 85 psi.

14. Apparatus for removing particulates from a flow of exhaust gas exhausted from a diesel engine and trapped in a filter comprising:
    means for producing compressed air,
    oxygen saturation means comprising at least one container provided with oxygen adsorber means communicating with said means for producing dry compressed air to receive compressed air and adsorb oxygen therefrom;
    conduit means providing communication of said oxygen saturation means with filter introduction means, said filter introduction means comprising a frame, a rotatable hollow shaft assembly mounted to said frame, a plurality of nozzles mounted on said shaft assembly which open towards open cells in a particulate filter to introduce oxygen enriched air into said particulate filter;
    means to rotate said shaft assembly,
    valve means positioned in said conduit means to selectively direct oxygen enriched air into said filter introduction means for distribution of said oxygen enriched air into said filter to lower the base temperature required for combustion of particulates trapped in said filter.

15. Apparatus for removing particulates from a flow of exhaust gas exhausted from a diesel engine and trapped in a filter comprising;
   means for producing dry compressed air,
   oxygen saturation means comprising at least one container provided with oxygen adsorber means communicating with said means for producing dry compressed air to receive compressed air and adsorb oxygen therefrom;
   conduit means providing communication of said oxygen saturation means with filter introduction means, said filter introduction means comprising a frame, a rotatable hollow shaft assembly mounted to said frame, said hollow shaft assembly comprising a hollow rotary shaft, a second pipe closed at both ends mounted to said hollow rotary shaft perpendicular to the axis of rotation of said rotary shaft, nozzle means mounted to said second pipe open towards open cells in a particulate filter to introduce oxygen enriched air into said particulate filter;
   means to rotate said shaft assembly,
   valve means positioned in said conduit means to selectively direct oxygen enriched air into said filter introduction means for distribution into exhaust gases passing into said filter allowing combustion of particulates trapped in said filter.

* * * * *